March 8, 1966  S. W. CRISPE  3,238,826
ENDLESS BELT CONVEYOR FOR INTERMITTENTLY
CONVEYING SHEET MATERIAL
Filed April 8, 1963  3 Sheets-Sheet 1
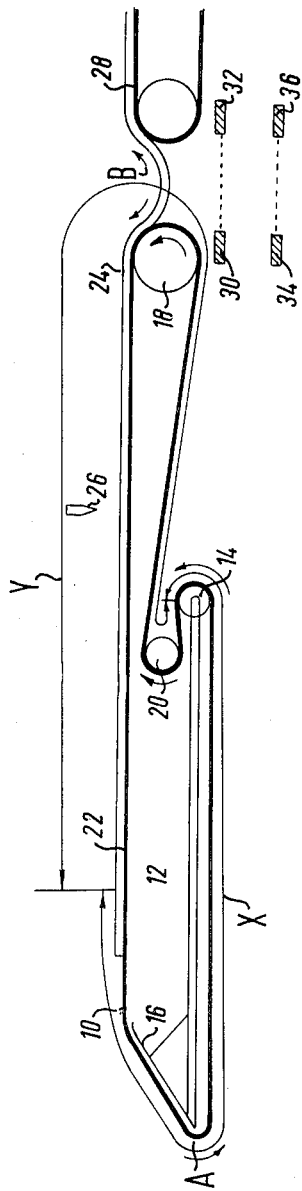
— FIG. 1 —
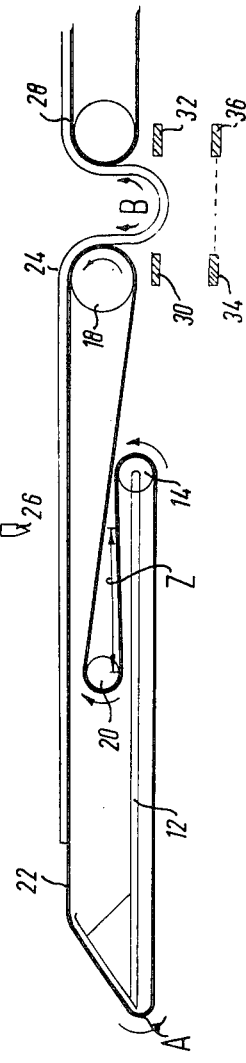
— FIG. 2 —
INVENTOR:
STANLEY WILLIAM CRISPE
BY
Browne, Schuyler + Beveridge
ATTORNEYS

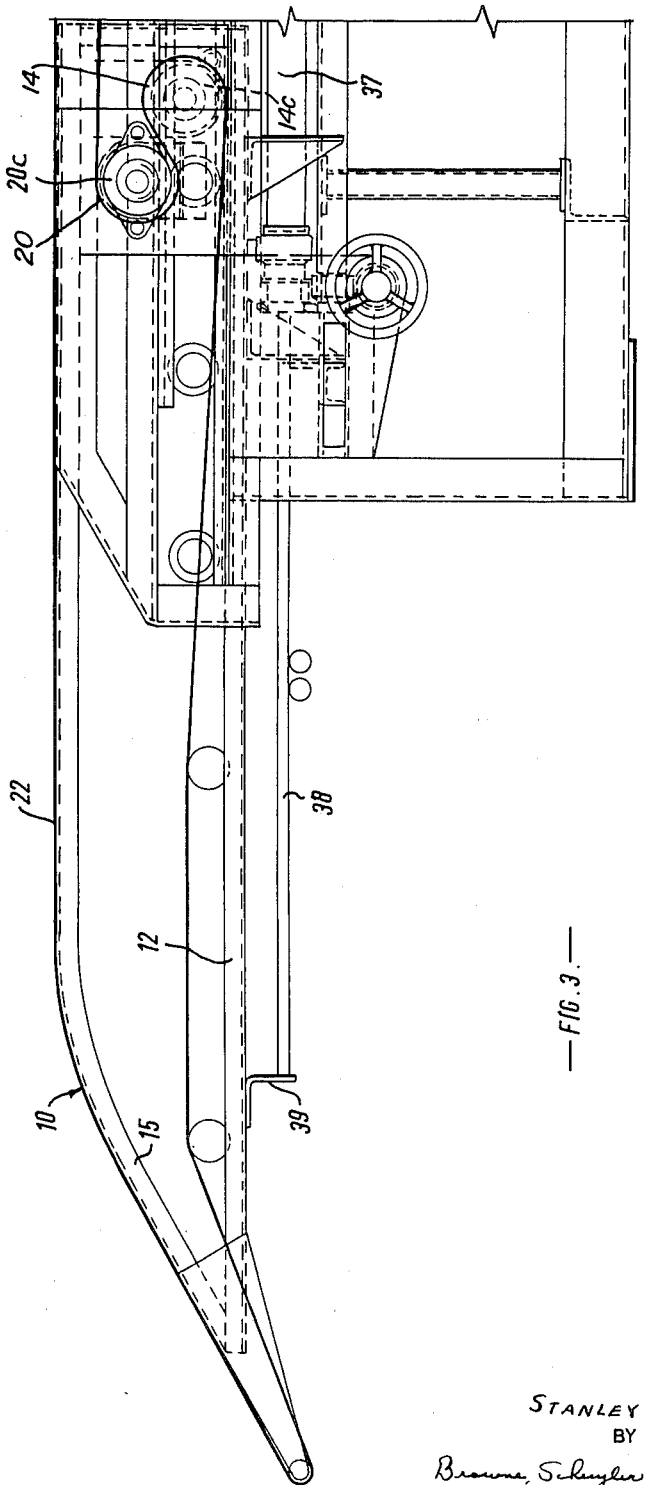

March 8, 1966  S. W. CRISPE  3,238,826
ENDLESS BELT CONVEYOR FOR INTERMITTENTLY
CONVEYING SHEET MATERIAL
Filed April 8, 1963  3 Sheets-Sheet 3
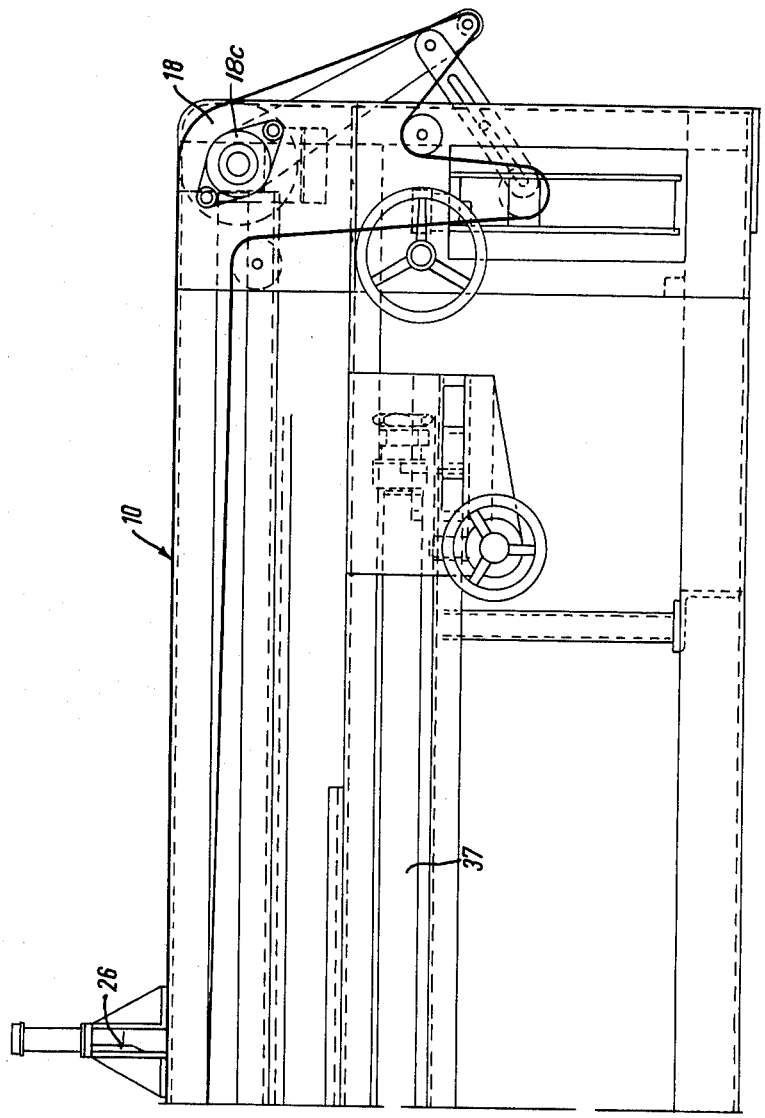
—FIG. 4.—
INVENTOR:
STANLEY WILLIAM CRISPE
BY
Browne, Schuyler + Burridge
ATTORNEYS United States Patent Office 3,238,826

Patented Mar. 8, 1966

3,238,826

ENDLESS BELT CONVEYOR FOR INTERMITTENTLY CONVEYING SHEET MATERIAL

Stanley William Crispe, Liverpool, England, assignor to T. & T. Vicars Limited, Lancashire, England, a British company Filed Apr. 8, 1963, Ser. No. 271,334
Claims priority, application Great Britain, Sept. 28, 1962, 36,883/62
9 Claims. (Cl. 83—65)

The present invention relates to conveyors, and more particularly relates to a device for intermittently conveying sheet material.

According to the present invention, a device for intermittently conveying sheet material, comprises a continuous web lapped in a serpentine configuration about a plurality of guides divided into two groups, one of which groups is reciprocably displaceable relative to the other and longitudinally of the web, at least some of the guides having a clutch mechanism associated therewith whereby some stretches only of the web move in a forward direction whenever said group of guides is projected, whilst other stretches move in a similar sense when said group of guides is retracted.

By this operation of the device, the uppermost or active stretch of the web is moved in the forward direction during projection of the displaceable group of guides and remains stationary during retraction thereof. Thus any sheet material carried by the uppermost or active stretch of the web is intermittently conveyed thereby.

The device is particularly applicable for use in the baking and confectionery industries wherein it is required to treat dough and other plastic materials in continuous sheet form. For example in the manufacture of crackers, biscuits and layered cakes the sheet is required to be cut into pieces of predetermined length and thereafter deposited in such a manner as to produce laminated products. For this purpose, cutting means are arranged above the uppermost or active stretch of the web, upon which the sheet of dough or other material is conveyed. The cutting means preferably comprises a moveable knife having a length at least equal to the width of the web, its movement being synchronized to cut the dough sheet during retraction of the displaceable group of guides when the uppermost or active stretch of the web is stationary.

Alternatively, it may be required to stamp or emboss portions of the dough sheet and hence the cutting means could be replaced by stamping means or embossing means, adapted to be brought into operation whilst the uppermost or active stretch of the web is stationary.

Preferably, the displaceable group of guides comprises a roller and an inclined plate fixedly spaced apart by means of a horizontally disposed member which is reciprocably drivable by pneumatic, hydraulic, electrical, or mechanical linkage connected thereto. The stationary group of guides comprises a pair of fixedly spaced apart rollers supported on a framework with the axes thereof parallel and in the same horizontal plane, which plane is above that containing the first group of guides.

The invention will be further described by way of example with reference to the accompanying drawings, in which:

FIG. 1 is a diagrammatic side elevational view of a device according to the present invention illustrating the displaceable group of guides in a projected position; and FIG. 2 is a diagrammatic side elevational view of the device illustrating the displaceable group of guides in a retracted position; and FIGS. 3 and 4 constitute a side elevation of a constructional embodiment of the device according to the present invention.

The device of the present invention will be described hereinafter with reference to its application in the baking and confectionary industries wherein continuous sheets of dough are required to be cut into pieces of a predetermined length and then deposited to form laminated products for use in the manufacture of crackers, biscuits and layered cakes. However, it will be appreciated that the device can be used to intermittently convey any sheet material and therefore is not to be limited to the application to be described.

Referring to the drawings, a device according to the present invention comprises a continuous web 10 lapped (as shown) in a serpentine configuration about a plurality of guides divided into two groups. One group of guides preferably comprises a horizontally disposed member 12 having mounted thereon a roller 14 and an inclined plate 16 such that the roller and the plate are fixedly spaced apart with the longitudinally axes thereof transversely of the web 10. The member 12 is drivable, by means of pneumatic, hydraulic, electrical or mechanical linkage connected thereto, so that said one group of guides is capable of reciprocable displacement relative to a second, stationary group of guides. In the embodiment shown in FIGS. 3 and 4 the member 12 of the displaceable group of guides is reciprocated by means of a pneumatic cylinder 37, the piston 38 of which is fixedly connected to the member 12 by a bracket 39.

The second group of guides comprises rollers 18, 20 supported by a framework (not shown in FIGS. 1 and 2) such that the rollers are fixedly spaced apart with the longitudinal axes thereof parallel and in the same horizontal plane, which plane is above that containing the first group of guides. The roller 18 has a larger diameter than the roller 20 so that the uppermost or active stretch 22 of the web 10 extending between the roller 18 and the inclined plate 16 is substantially horizontal.

Clutches 14C, 18C and 20C (see FIGS. 3 and 4) are associated with rollers 14, 18 and 20 respectively such that the rollers 14, 18, and 20 are capable of rotation only in the direction of the arrows indicated in FIGS. 1 and 2. On movement of the plate member 12 from the projected position of FIG. 1 to the retracted position of FIG. 2, rotation of roller 20 or rollers 18 and 20 is prevented by clutches 18C and 20C (see FIGS. 3 and 4) or other suitable means associated therewith, and the stretch X of the web 10 is drawn over the roller 14 and the inclined plate 16 in the direction of the arrow A whilst the stretch Y of web 10 remains stationary. The amount of movement of the web 10 is determined by the distance moved by the displaceable group of guides during retraction thereof. The new position of stretch X is illustrated in FIG. 2.

When the displaceable group of guides is moved from the retracted position to the projected position, the rollers 18 and 20 are rendered freely rotatable by releasing the clutches **18*c* and 20*c* (see FIGS. 3 and 4) thereof but the roller 14 is now prevented from rotating by the actuation of clutch 14*c*** (see FIG. 3) or other suitable means associated therewith. This results in the uppermost or active stretch 22 of the web 10 increasing in length due to the taking up of the stretch Z of the web between the roller 14 and the roller 20. Once again the movement of the web 10 corresponds to the distance moved by the displaceable group of guides.

When a continuous sheet of dough 24 is to be treated in the manner hereinbefore described it is lead to the present device by a conveyor 28 arranged at the right hand side thereof, as viewed in the drawings. The dough sheet 24 is deposited on the uppermost or active stretch 22 of the web 10 and is moved intermittently along therewith during each movement of the displaceable group of guides from the retracted position to the projected position for a distance corresponding to the distance moved by this group.

During the retraction stroke of member 12 when the stretch Y of web 10 is stationary the continuous sheet of dough 24 feeding at a constant rate from conveyor 28 forms a loop at B, the required length of which is detected and controlled by a device comprising sensing elements 30, 32 which can be electrically, mechanically or pneumatically operated.

When member 12 has reached its fully retracted position (FIG. 2) and dough loop B extends to contact the sensing elements 30, 32, the detection device causes member 12 to move forward, at a controlled rate and faster than the speed of conveyor 28, to the fully projected position, so drawing dough loop B of FIG. 2 up to the position of dough loop B, FIG. 1. This increase and decrease of the dough loop B is repeated during each retraction and projection movement of member 12 and is detected by sensing elements 30, 32, which control the projection movement of member 12 so synchronising the movement of member 12 with achievement of the length of dough loop B of FIG. 2.

A further and similar detection device comprising sensing elements 34, 36 is mounted in such a position below sensing elements 30, 32 that, should the continuous sheet of dough feeding at a constant rate from conveyor 28 break, and so fail to be drawn on to web 10, the second detection device would detect this unusually long loop of dough when it extends down to elements 34, 36 and stop conveyor 28.

The uppermost or active stretch of the web 10, extending between the roller 18 and the inclined plate 16, is stationary during retraction of the displaceable group of guides. Cutting means in the form of a moveable knife 26 is suitably mounted above the uppermost or active stretch of the web 10, its movement being synchronized to cut the dough sheet when the uppermost or active stretch of the web 10 is stationary. The knife 26 is also adjustable to compensate for any variation made to the length of the stroke of the displaceable group of guides so that the leading edge of each cut piece of dough sheet about to be deposited rests at the lower edge of the inclined plate 16 when the group of guides starts to retract. During each retracting stroke a cut piece of dough sheet is peeled from the web 10 in the region of the inclined plate 16. The cut pieces can then be deposited onto a continuously or intermittently moveable conveyor arranged beneath the device, which conveyor can have a direction of travel in the same sense as the direction of movement of the web 10 or transversely thereto.

As stated hereinbefore, the cut pieces of the dough sheet can then be deposited in such a manner onto the conveyor as to form a laminated product. This operation has been carried out, heretofore, manually or automatically by machines commonly referred to in baking and confectionery art as "laminators." These machines have a tendency to be cumbersome and very complicated whereas the present device has the advantage of being greatly simplified in operation and construction as compared therewith.

I claim:
1. A device for receiving plastic material in continuous sheet form and delivering the material in individual sheets, comprising an endless web, a plurality of guides about which said web is lapped in a serpentine configuration, said guides being divided into two groups, one of said groups being reciprocably displaceable relative to the other stationary group of guides and longitudinally of said web, drive means for reciprocating said one of said groups of guides, clutch means associated with at least some of the guides so that the uppermost stretch of said web is moved whenever said one of said groups of guides is projected and remains stationary during retraction thereof, and cutting means mounted above the uppermost stretch of said web and having the movement thereof synchronised to cut sheet material carried on said upper most stretch of said web when said uppermost stretch is stationary.

2. A device for intermittently conveying sheet material, comprising an endless conveyor belt, two groups of guides about which said belt is lapped in a serpentine configuration, one of said groups being stationary and the other of said groups being reciprocably displaceable relative to said one of said groups and longitudinally of said belt, said one of said groups comprising a pair of fixedly spaced apart rollers mounted on a framework, the axes of which are parallel and in the same horizontal plane which is above a plane containing said other of said groups, said other of said groups comprising a roller, an inclined plate fixedly spaced apart from said roller by means of a horizontally disposed member, said member being reciprocably drivable by a linkage connected thereto, and clutch means associated with at least some of the rollers, whereby when said other of said groups of guides is projected away from said one of said groups the uppermost stretch of said belt is moved in a forward direction and when said other of said groups is retracted towards said one of said groups the uppermost stretch of said belt remains stationary.

3. A device as set forth in claim 2, including cutting means mounted above the uppermost stretch of said belt, said cutting means having the movement thereof synchronised with the movement of said other of said groups of guides to cut sheet material on said belt when the uppermost stretch is stationary.

4. A device as set forth in claim 2, wherein the sheet material is fed onto the uppermost stretch of said belt at a uniform rate from a conveyor arranged at the end thereof remote from said other of said groups of guides.

5. A device as set forth in claim 2, wherein said linkage comprises a pneumatically operable piston.

6. A device for intermittently conveying sheet material fed thereto at a substantially constant rate from a conveyor, comprising a stationary group of guides and a group of guides reciprocably movable relative to said stationary group, a continuous web lapped in a serpentine configuration about said groups of guides, pneumatically operable linkage means for reciprocating said moveable group of guides, clutch means associated with at least some of the guides whereby the uppermost stretch of the web is moved in a direction corresponding to the path of movement of said moveable group of guides relative to said stationary group when said moveable group is projected and remains stationary during retraction thereof, and sensing means arranged beneath and between the present device and said feed conveyor for detecting and controlling a loop of sheet material formed therebetween when said uppermost stretch of web is stationary.

7. A device as set forth in claim 6, wherein the detection of the loop of sheet material by the sensing means effects projection of said moveable group of guides.

8. A device as set forth in claim 6, wherein a second sensing means is mounted in such a position below said first-mentioned sensing means that in the event of a break occurring in the sheet material feeding from said feed conveyor, said second sensing means detects the unusually long loop of material and stops said conveyor.

9. A device as set forth in claim 6, wherein cutting means are mounted above the uppermost stretch of the web, said cutting means being synchronised to cut sheet material carried on the uppermost stretch of the web when it is stationary.

References Cited by the Examiner

UNITED STATES PATENTS

| | | | |
|---|---|---|---|
| 739,233 | 10/1902 | Stocker | 271—78 |
| 916,318 | 3/1909 | Humphry | 271—78 |
| 969,418 | 9/1910 | Staude | 83—236 |
| 1,566,701 | 12/1925 | Schumacher | 271—78 X |
| 2,161,123 | 6/1939 | Avery et al. | 83—236 |
| 2,348,456 | 5/1944 | Dickerman | 226—148 X |
| 2,788,201 | 4/1957 | Lingren et al. | 198—139 X |

WILLIAM W. DYER, JR., *Pirmary Examiner.*

ANDREW R. JUHASZ, *Examiner.*

J. M. MEISTER, *Assistant Examiner.*